(No Model.)

J. F. WHITE.
BOW SPRING FOR EYEGLASSES.

No. 365,496. Patented June 28, 1887.

Attest.
Sidney P. Hollingsworth
W. R. Kennedy

Inventors.
J. F. White
By his Atty.
Phil T. Dodge

UNITED STATES PATENT OFFICE.

JOHN F. WHITE, OF GALLATIN, ASSIGNOR TO CHARLES W. TAYLOR, OF CHATTANOOGA, TENNESSEE.

BOW-SPRING FOR EYEGLASSES.

SPECIFICATION forming part of Letters Patent No. 365,496, dated June 28, 1887.

Application filed January 24, 1887. Serial No. 225,367. (No model.)

*To all whom it may concern:*

Be it known that I, JOHN F. WHITE, of Gallatin, in the county of Sumner and State of Tennessee, have invented certain Improvements in Eyeglasses, of which the following is a specification.

This invention relates to that class of eyeglasses in which the two glasses or lenses are united by a spring.

The aim of the invention is to permit the folding or closing of the glasses without subjecting the spring to increased tension, as usual, and this for the double purpose of avoiding breakage and of preventing the tension of the spring from becoming changed.

It consists, essentially, in providing the connecting-spring with a joint the pivot of which stands in a horizontal position, so that the glasses may be folded together in a plane parallel with their faces. The joint may be variously constructed, and the spring portion connected thereto in any appropriate manner which will admit of the glasses being folded in the manner described.

Figure 1:
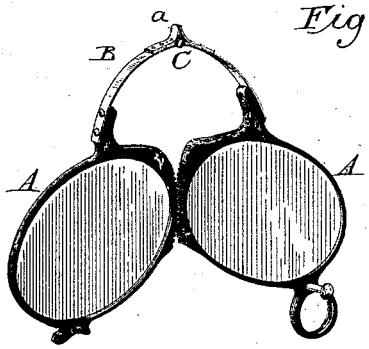
Figure 2:
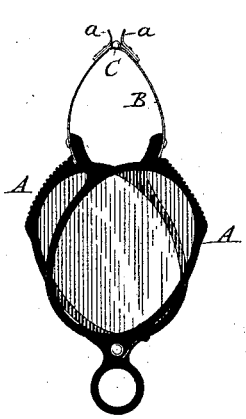

In the accompanying drawings, Figure 1 is a perspective view of a pair of glasses having my improvement incorporated therein. Fig. 2 is a face view of said glasses in a closed condition.

Referring to the drawings, A A represent the two glasses or lenses, and B the connecting-spring attached at its ends to the respective glasses or their frames. This spring, instead of being continuous, as usual, is divided transversely at the middle and the adjacent ends united by a hinge or joint, C, the top of which lies in a horizontal position—that is to say, in a line parallel with the focal axis of the glasses. The hinge is of the familiar knuckle type—that is, provided with shoulders *a*, by which its opening movement is limited. This joint permits the glasses to be folded together or overlapped by moving them in planes parallel with their own surfaces. As the glasses are moved apart to a proper position for use the shoulders of the hinge are brought into action and the two ends of the spring maintained in such relation that they will be properly strained in the act of applying the glasses to the nose as usual. It is to be observed that under my construction the spring is entirely relieved from strain when the glasses are not in use. It is to be noted, also, that the arrangement of the hinge pin or pivot in a horizontal position insures the perfect rigidity of the joint when the glasses are opened, so that they cannot fold or bend out of position, as would be the case were the pivot arranged vertically.

As shown in the drawings, the hinge-joint is formed by properly bending and cutting the ends of the spring-sections that they may be fitted together after the manner of an ordinary hinge. The stops or shoulders *a* are formed of separate plates applied to the outer surfaces of the springs and riveted thereto. It is to be distinctly understood, however, that any equivalent form or joint may be substituted therefor.

I am aware that it is old to construct an eyeglass with a divided spring having its two parts united by a vertical pivot, so that the two lenses could be folded together like the leaves of a book, and to this construction I lay no claim.

Having thus described my invention, what I claim is—

1. In an eyeglass having its two lenses connected by a spring, a divided spring having its two parts united by a hinge or joint, the axis of which is parallel with the focal axis of the glasses.

2. The combination of the lenses A A, the divided spring B, and knuckle-joint C, having a horizontal axis, substantially as described.

3. The lenses A, the divided spring B, having its adjacent ends formed and united by a horizontal pivot, in combination with shoulders or stops *a*.

In testimony whereof I hereunto set my hand, this 20th day of December, 1886, in the presence of two attesting witnesses.

JOHN F. WHITE.

Witnesses:
W. H. BROWN,
H. H. CROCKETT.